United States Patent
Wang

(10) Patent No.: US 7,656,556 B2
(45) Date of Patent: Feb. 2, 2010

(54) DETECTION OF A DIFFERENTIAL GLOSS REGION IN A CLUSTER-SCREEN HALFTONE IMAGE USING FILTERS EACH HAVING A DIFFERENT POLARIZATION

(75) Inventor: Shen-ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 415 days.

(21) Appl. No.: 11/712,356

(22) Filed: Feb. 28, 2007

(65) Prior Publication Data

US 2008/0204811 A1 Aug. 28, 2008

(51) Int. Cl.
*H04N 1/387* (2006.01)
*H04N 1/40* (2006.01)
*G06K 9/36* (2006.01)
*G06T 5/00* (2006.01)
*B41M 3/10* (2006.01)

(52) U.S. Cl. .............. 358/2.1; 358/3.17; 358/3.27; 358/3.26; 382/191; 382/260; 382/278

(58) Field of Classification Search ............. 358/1.9, 358/2.1, 3.06, 3.09, 3.13–3.22, 3.26–3.28, 358/533–536, 462, 464; 382/100, 190, 191, 382/195, 205, 260, 270, 278
See application file for complete search history.

(56) References Cited

U.S. PATENT DOCUMENTS

| 5,734,752 | A | 3/1998 | Knox |
| 6,263,086 | B1 * | 7/2001 | Wang ................... 382/100 |
| 7,092,128 | B2 | 8/2006 | Wang et al. |
| 7,126,721 | B2 | 10/2006 | Wang et al. |
| 7,148,999 | B2 | 12/2006 | Xu et al. |
| 7,391,537 | B2 * | 6/2008 | Eschbach et al. ........... 358/3.06 |
| 2003/0231349 | A1 | 12/2003 | Wang et al. |
| 2004/0000786 | A1 | 1/2004 | Xu et al. |
| 2004/0051909 | A1 | 3/2004 | Curry et al. |
| 2004/0057598 | A1 | 3/2004 | Bradley |
| 2004/0114160 | A1 | 6/2004 | Wang et al. |
| 2005/0128523 | A1 | 6/2005 | Liu et al. |
| 2005/0128524 | A1 | 6/2005 | Liu et al. |

(Continued)

OTHER PUBLICATIONS

Non-Provisional Utility Appln., dated Feb. 13, 2007, Hains, Glossmark Image Simulation.

(Continued)

*Primary Examiner*—Scott A Rogers
(74) *Attorney, Agent, or Firm*—Fay Sharpe, LLP

(57) ABSTRACT

An apparatus and method are provided for processing a digital image to determine whether the image includes a region of differential gloss (which would yield a differential gloss when that digital image is printed into hardcopy). The method includes identifying whether an input digital image has a periodic characteristic which is indicative of a cluster screen halftoned digital image and, if so, determining a correlation between first and second filters and halftone structures of the identified digital image. The second filter has a different polarization from the first filter. The first and second filters are selected to enable a region of differential gloss in the identified digital image to be identified, based on the determined correlations. Where such a region or regions are detected, a representation of the differential gloss image may be displayed and/or another action automatically initiated, such as restricting printing of the image.

22 Claims, 7 Drawing Sheets

U.S. PATENT DOCUMENTS

| | | |
|---|---|---|
| 2005/0286083 A1 | 12/2005 | Wang et al. |
| 2006/0044617 A1 | 3/2006 | Wang et al. |
| 2006/0072159 A1 | 4/2006 | Eschbach et al. |
| 2006/0127117 A1 | 6/2006 | Eschbach et al. |
| 2008/0193860 A1* | 8/2008 | Hains .................. 358/1.9 |

OTHER PUBLICATIONS

U.S. Appl. No. 11/705,249, filed Feb. 12, 2007, Wang et al.

* cited by examiner

| 16 | 15 | 11 | 3  | 4  | 8  |
|----|----|----|----|----|----|
| 12 | 18 | 13 | 7  | 1  | 6  |
| 10 | 14 | 17 | 9  | 5  | 2  |
| 3  | 4  | 8  | 16 | 15 | 11 |
| 7  | 1  | 6  | 12 | 18 | 13 |
| 9  | 5  | 2  | 10 | 14 | 17 |

TYPE A SCREEN

| 11 | 15 | 16 | 8  | 4  | 3  |
|----|----|----|----|----|----|
| 13 | 18 | 12 | 6  | 1  | 7  |
| 17 | 14 | 10 | 2  | 5  | 9  |
| 8  | 4  | 3  | 11 | 15 | 16 |
| 6  | 1  | 7  | 13 | 18 | 12 |
| 2  | 5  | 9  | 17 | 14 | 10 |

TYPE B SCREEN

*FIG. 1*

FIG. 6
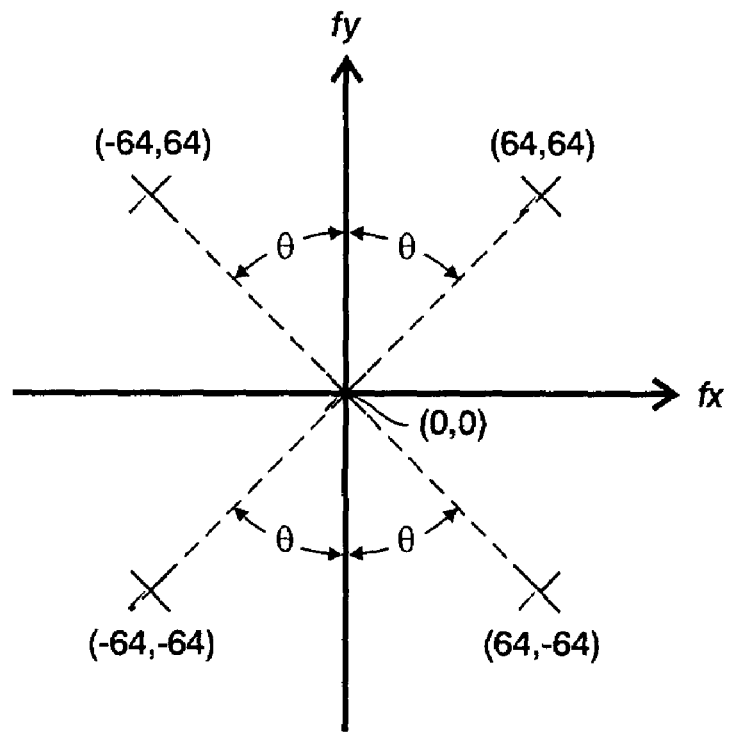
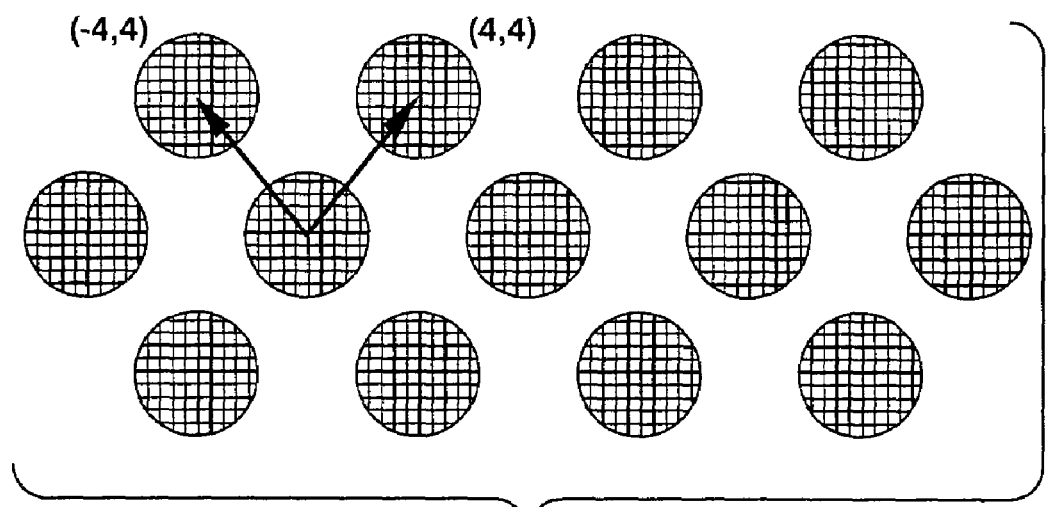
FIG. 7

DETECTION OF A DIFFERENTIAL GLOSS REGION IN A CLUSTER-SCREEN HALFTONE IMAGE USING FILTERS EACH HAVING A DIFFERENT POLARIZATION

CROSS REFERENCE TO RELATED PATENTS AND APPLICATIONS

Cross reference is made to the following copending applications, the disclosures of which are incorporated herein in their entireties by reference:

Application Ser. No. 11/705,249, filed Feb. 12, 2007, entitled COLOR-CONSISTENT THREE LEVEL DIFFERENTIAL GLOSS IMAGES, by Shen-Ge Wang, et al., and Application Ser. No. 11/706,022, filed Feb. 13, 2007, entitled GLOSSMARK IMAGE SIMULATION, by Charles M. Hains.

BACKGROUND

The exemplary embodiment relates generally the gloss inherent in the hardcopy of image data be it pictorial or text. More particularly, it relates to the detection of embedded patterns in halftoned image data which yield differential gloss patterns when that halftone image data is printed into hardcopy.

Digital watermarks have been applied to images for a variety of purposes, including verification of authenticity of documents, providing information, and prevention of copying. Many of the techniques for generating such watermarks involve adding image data or modifying image data in an existing image prior to printing the image. In other techniques, selective application of a clear toner to a rendered image is used to create a watermark.

More recently, Glossmark™ technology based on differential gloss has been used for the generation of digital watermarks. The technology allows a digital watermark to be introduced without modification of the original image content or use of special marking materials or substrates. Rather, the technique creates a differential gloss image which can be discerned by a human reader holding the printed paper at an angle but which cannot be detected by a scanner or copier during normal scanning. These devices are restricted to reading the image at a fixed angle to the paper, which is generally selected so as to minimize the impact of specular reflection. The differential gloss image is created by selective use of two different halftone screens which create two different gloss characteristics in halftone outputs.

In halftone printing, a contone image (an image in which gray levels are substantially continuously variable) is converted to a binary image before printing. At a specified location, or pixel, a spot is either printed or not printed, which is controlled by halftone techniques. The most common halftoning method is screening, in which a halftone screen determines how a cluster of pixels grows with increasing gray level. Here, gray level refers to increasing intensity for any channel, irrespective of whether it is a monochrome or a color channel. The halftone screen compares the required continuous tone levels with predetermined threshold levels typically defined for a rectangular cell that is tiled to fill the image plane. The output of the screening process is a binary pattern of multiple small "dots," which are regularly spaced in a grid as is determined by the size, shape, and tiling of the halftone screen. In conventional screening process, the dots grow generally radially outward as gray level increases to form circular-shaped clusters. In current Glossmark™ technology, two halftone screens having different anisotropic structure orientations are used. The anisotropic structure may be provided by the growth pattern and/or orientation of the screen. By toggling between the two halftone screens in generating the halftone image, differences in gloss are apparent when the rendered image is viewed at an angle.

For security or tracking purposes, it is sometimes desirable to detect whether a digital halftone image submitted to a printer contains an embedded differential gloss pattern prior to printing of the image.

INCORPORATION BY REFERENCE

Cross reference is made to the following patents and applications, the disclosures of which are incorporated by reference herein in their entireties:

U.S. Pat. No. 5,734,752, issued Mar. 31, 1998, by Knox, discloses a method for generating watermarks in a digitally reproducible document which are substantially invisible when viewed. The method includes producing a first stochastic screen pattern suitable for reproducing a gray image on a document, deriving at least one stochastic screen description that is related to the first pattern, producing a document containing the first stochastic screen, producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

U.S. Pat. No. 7,092,128, issued Aug. 15, 2006, (U.S. Pub. No. 20040156078), entitled APPLICATION OF GLOSSMARKS FOR GRAPHICS ENHANCEMENT, by Shen-Ge Wang, et al., relates to a method for providing a designer with the tools for the manipulation of differential gloss in halftoned images. A special mask layer is provided for the rendering of desired Glossmark image data. The desired Glossmark image data is used to select between two halftones with anisotropic structure characteristics which are significantly different in orientation while remaining identical in density. This selection is made for each corresponding portion of primary image data. In this way, a halftone image of the primary image is generated with Glossmarks embedded therein which will display differential gloss without the need for special toners or paper.

U.S. Pat. No. 7,126,721, issued Oct. 24, 2006, (U.S. Pub. No. 20040001233), entitled PROTECTING PRINTED ITEMS INTENDED FOR PUBLIC EXCHANGE WITH GLOSSMARKS, by Shen-Ge Wang, et al., relates to the protection of printed items intended for public exchange having important informational indicia provided therein. The print items are protected from tampering by providing an informational indicia image as a Glossmark. By selectively applying halftones with anisotropic structure characteristics which are significantly different in orientation while remaining identical in density to render information indicia, a Glossmark™ image is produced of the information indicia. Such an information indicia Glossmark™ image when provided in print item image helps protect that print item image from tampering.

U.S. Pat. No. 7,148,999, issued Dec. 12, 2006 (Pub. No. 20040000786), entitled VARIABLE GLOSSMARK, by Beilei Xu, et al. relates to the segmentation of an image into a main area and an image segment for variable Glossmark data. By selectively applying halftones with anisotropic structure characteristics which are significantly different in orientation while remaining identical in density to the image segment, a variable Glossmark may be superimposed within an image with reduced processing and storage requirements.

U.S. Pub. No. 20030231349, published Dec. 18, 2003, entitled HALFTONE IMAGE GLOSS CONTROL FOR GLOSSMARKS, by Shen-Ge Wang, et al. relates to the manipulation of differential gloss as may be inherent in halftoned images. By selectively applying halftones with anisotropic structure characteristics which are significantly different in orientation while remaining identical in density, a gloss image may be superimposed within an image without the need for special toners or paper.

U.S. Pub. No. 20040114160, published Jun. 17, 2004, entitled TAG CONTROL FOR RUNTIME GLOSSMARKS, by Shen-Ge Wang, et al., relates to the manipulation of differential gloss as may be inherent in halftoned images by utilization of tags. A method for the manipulation of the differential gloss in a halftone image is disclosed which includes receiving primary image data, receiving desired Glossmark image data, and tagging at least some portion of the primary image data, as directed by the desired Glossmark image with a first tag setting. By selectively applying halftones with anisotropic structure characteristics, which are significantly different in orientation while remaining identical in density, as directed by tag settings, a Glossmark image may be superimposed within an image without the need for special toners or paper.

U.S. Pub. No. 20050128523, published Jun. 16, 2005, entitled REDUCTION OF DIFFERENTIAL GLOSS, by Chu-Heng Liu, et al., discloses a method for reduction of differential gloss as found in hardcopy image prints. The method includes selecting a first halftone having a high apparent gloss characteristic, selecting a second halftone having a low apparent gloss characteristic while retaining an identical matching density characteristic to the first selected halftone, applying the first halftone to at least some portion of the halftone image, and applying the second halftone to the remaining portion of the halftone image.

U.S. Pub. No. 20050128524 published Jun. 16, 2005, entitled ENHANCEMENT OF GLOSSMARK IMAGES AT LOW AND HIGH DENSITIES, by Chu-Heng Liu, et al., discloses a method for the manipulation of the differential gloss in a halftone image. The method includes selecting a first halftone having a first anisotropic structure orientation, selecting a second halftone having a second anisotropic structure orientation different from that of the first halftone, applying the first halftone to at least some portion of the halftone image, applying the second halftone to the remaining portion of the halftone image, and applying a clear toner to some portion of a hardcopy output of the resulting halftone image.

U.S. Pub. No. 20050286083, published Dec. 29, 2005, entitled GLOSSMARK IMAGES WITH CLEAR TONER, by Shen-Ge Wang, et al., relates to the creation of differential gloss images in clear toner by the manipulation of halftones employed prior to the depositing of the clear toner layer upon a substrate. By selectively applying halftones with anisotropic structure characteristics which are significantly different in orientation although remaining identical in density, a differential gloss image may be superimposed within even clear toner as applied to paper. Further, this technique may be used to enhance color toner Glossmark images across the low and high density areas of application where the differential gloss effect would otherwise be weak.

U.S. Pub. No. 20060044617, published Mar. 2, 2006, entitled REDUCTION OF DIFFERENTIAL GLOSS WITH HALFTONED CLEAR TONER, by Shen-Ge Wang, et al., discloses a method for reduction of differential gloss as found in halftone image hardcopy prints. The method includes selecting either a single halftone or employing two halftones: a first halftone having a high apparent gloss characteristic and a second halftone having a low apparent gloss characteristic. A determination is then made of which areas of the halftone image correspond to potentially high gloss and low gloss regions under normal printing conditions. An overlay of clear toner is applied to the hardcopy print of the halftone image.

U.S. Pub. No. 20060072159, published Apr. 6, 2006, entitled VARIABLE DATA DIFFERENTIAL GLOSS IMAGES, by Reiner Eschbach, et al., relates to the segmentation of an image into a main area and an image segment for variable data differential gloss image control. A method for variable data differential gloss image control includes selecting a single color, selecting a first halftone having a first anisotropic structure orientation, creating a first color definition comprising the single color and the first halftone, selecting a second halftone having a second anisotropic structure orientation different from that of the first halftone, creating a second color definition comprised of the single color and the second halftone, applying the first color definition to at least some portion of an image of interest, and applying the second color definition to the remaining portion of the image of interest to produce a variable data differential gloss image.

U.S. Pub. No. 20060127117, published Jun. 15, 2006, entitled USER INTERFACE FOR DIFFERENTIAL GLOSS IMAGES, by Reiner Eschbach, et al., discloses a user interface for the effective generation of differential gloss images. The user is instructed to indicate the base primary image data, and the desired differential gloss image data. This data may be displayed for verification and position adjustment by superimposition of the differential gloss image data upon the base image data. In an alternative, the placement information may be inferred from the position of originals upon the scanner or copier platen and the result may or may not be displayed. By selectively applying halftones with different anisotropic structure orientation characteristics to the base primary image data as directed by the desired differential gloss image data, a differential gloss image file or hardcopy may be provided.

BRIEF DESCRIPTION

In accordance with one aspect of the exemplary embodiment, a method for processing a digital image includes identifying a digital image which has a periodic characteristic which is indicative of a cluster-screen halftoned digital image and determining a correlation between first and second filters and halftone structures of the identified digital image, the second filter having a different polarization from the first filter, the first and second filters being selected to enable a region of differential gloss in the identified digital image to be identified, based on the determined correlations.

In accordance with another aspect, a system for processing a digital image includes a halftone detection component which identifies a digital image which has a periodic characteristic that is indicative of a cluster-screen halftoned digital image. A correlation component determines a correlation between first and second filters and halftone structures of the identified digital image. The second filter has a different polarization from the first filter. The first and second filters are selected to enable a region of differential gloss in the identified digital image to be identified, based on the determined correlations.

In accordance with another aspect, a method for processing a digital image is provided. The method includes, for a digital image which is determined to be cluster-screen halftoned, generating a first polarized filter which correlates more strongly with halftone structures having a first anisotropic structure and a second polarized filter which correlates more strongly with halftone structures having a second anisotropic structure. The first and second filters are applied to the digital image such that a first region of halftone structures is distinguishable from a second region of halftone structures, where present, based on the correlations of the first and second polarized filters. A representation of the image is generated whereby an identified first region is visually distinguishable from an identified second region.

BRIEF DESCRIPTION OF THE DRAWINGS

FIG. 1 shows two 6×6 halftone screens suitable in anisotropic structure to produce discernable gloss differentials for practicing the exemplary method;

FIG. 6 is a representation of the output of a Fast Fourier Transform (FFT) algorithm applied to image data for identifying a halftone image based on relative locations of four modulus peaks;

FIG. 7 illustrates information extracted from the FFT output of FIG. 6, regarding the locations of cluster centers.

DETAILED DESCRIPTION

Figure 2:
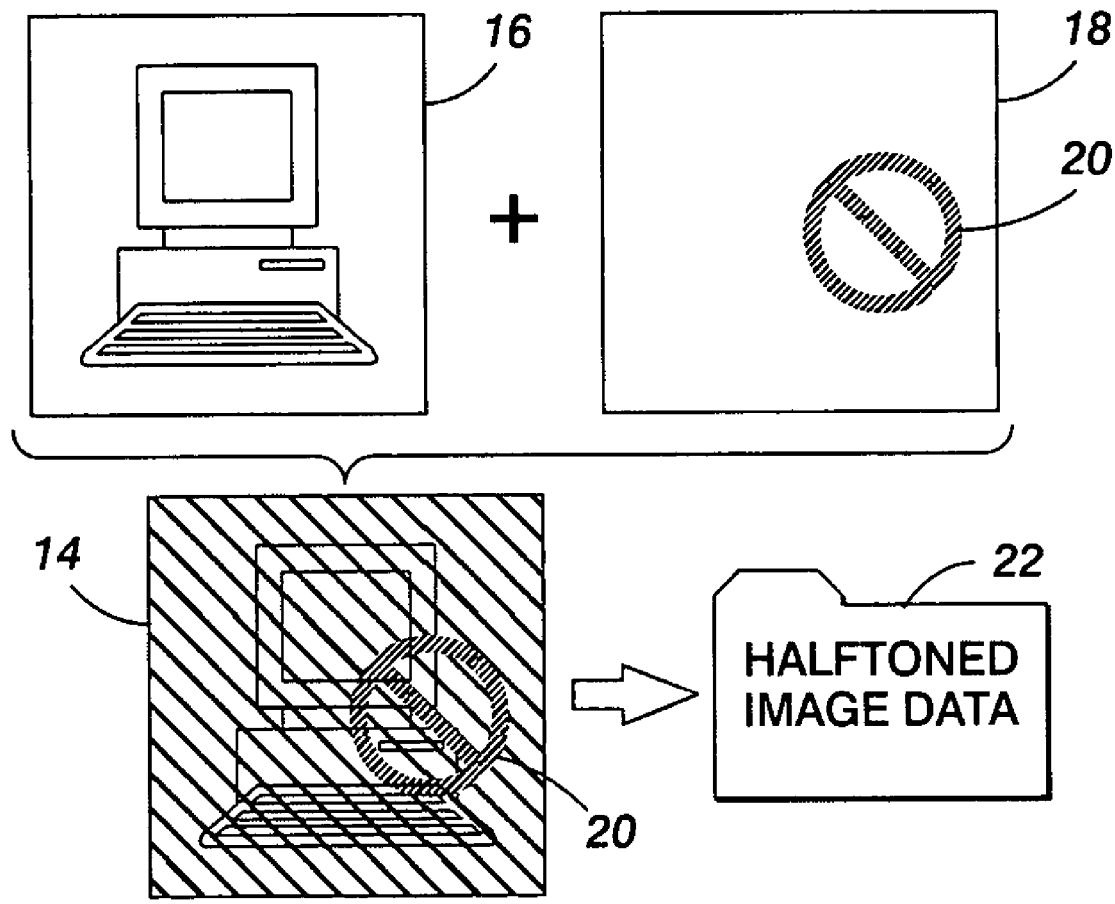
FIG. 2 depicts the formation of a differential gloss image using two halftone patterns.

The exemplary embodiment relates to a method and to an apparatus for detection of embedded differential gloss (Glossmark™) patterns in digital image data. In various aspects, the method includes determining whether the image data is pre-halftoned by cluster screens and if so, applying filters of two different polarizations to the image data to classify clusters of pixels of the image into groups according to their polarization. Regions classified in a first of the groups may be displayed with a different color or intensity than regions classed in a second of the groups whereby the Glossmark™ pattern is visible on a screen.

The exemplary method and apparatus take as input a digital image file which may or may not contain a differential gloss pattern or "watermark." The exemplary method enables a computer implemented process to be initiated based on whether or not a differential gloss image is detected, such as display of a representation of the image in which regions of differential gloss are simulated, identification of the image as containing a watermark, detection of the placement of the watermark, restricting printing, e.g., by blocking printing of the file or by requiring input of a password before printing is permitted, or other computer implemented process.

Techniques for generating differential gloss patterns in printed images are described, for example, in above-mentioned U.S. Pat. Nos. 7,092,128 and 7,126,721 and in Publication Nos. 20030231349, 20040000786, 20040114160, 20050128523, 20050128524, 20060072159, 20060127117, incorporated herein by reference. A digital image which has been pre-halftoned includes binary image data, for one or more color channels. In the case of a monochrome image, the image data may be for a single color channel, such as a black channel. In the case of a color image, image data for up to four (or more) color channels, such as cyan, magenta, yellow and optionally black channels may be provided.

In a differential gloss image, as used herein, a plurality of different halftone screens may be used in forming a halftoned binary image. The screens may generate halftone structures with similar sizes and shapes but different polarization directions. By toggling between the halftone screens in generating the halftone image, regions of the printed image have different gloss characteristics. These differences are apparent as differences in gloss when the rendered image is viewed at an angle. The embedded gloss pattern created by this process may be, for example, a text, logo, or binary image. In the case of a color image, the same pattern may be embedded into each of the color channels (CMYK), such that when rendered, the differential gloss patterns are substantially in superimposition one on top of the other in the printed image.

A printer, as used herein can include any device for rendering an image on print media, such as a laser printer, bookmaking machine, or a multifunction machine having copying and/or faxing as well as printing capability. "Print media" can be a usually flimsy physical sheet of paper, plastic, or other suitable physical print media substrate for images. A "print job" or "document" is normally a set of related sheets, usually one or more collated copy sets copied from a set of original print job sheets or electronic document page images, from a particular user, or otherwise related. An image generally may include information in electronic form which is to be rendered on the print media by the printer and may include text, graphics, pictures, and the like. The operation of applying images to print media, for example, graphics, text, photographs, etc., is generally referred to herein as printing or marking. While in the exemplary embodiment, the printer is described in terms of a xerographic printer, it is also contemplated that the printer may incorporate inkjet or other marking technology.

The halftone screens used in generating the differential gloss patterns have different anisotropic structure orientations provided by differences in dot growth patterns. Typically, the halftone structures (clusters) generated by the screens have similar sizes and shapes (for a given gray level) but different polarization directions.

If the incident light is from directly above the paper, the diffused light and the reflected light at orthogonal angles to the paper for the two halftone structures are typically equal. In this way, the light which is available to a scanner or to the human eye from directly above is the same. However, the specular reflected light is considerably greater for one of the anisotropic orientations at a given off-normal angle. If as printed, a mass of the first orientation halftones are butted directly adjacent to a mass of the second orientation halftones, there will be a difference in reflected light between them, which when viewed from an angle will be perceived as gloss differential, or a differential gloss (Glossmark™) image. The perceptibility of this gloss differential is generally maximized when the halftone anisotropic orientations are 90 degrees apart. In practice, this is typically provided by screens at +45° and −45° from the printing (process) direction. For each dot location, the screen may comprise a grid of cells (pixels), each of which may be on or off. The dot may grow, with increasing gray level, from a single pixels or from multiple pixels. It will be appreciated that the anisotropy is most apparent at intermediate gray levels where at least some but not all the pixels are turned on. At high or low gray levels, where substantially all or none of the pixels are turned on, the anisotropy is diminished or absent.

In one embodiment, the halftone dot growth may be as illustrated in FIG. 1, which shows the orders in which pixels are switched on for two exemplary 6×6 halftone screens. The type-A screen 10 and type-B screen 12 both have a 45 degree orientation, one to the right and the other to the left. The orientation can be easily seen in the case when only pixels with rank orders equal or less than about 3 are switched on. To maximize the perceptibility of the gloss differential, the orientations of screens type-A and type-B are arranged at 90 degrees one from the other. However, the exemplary method is not limited to the halftone screens shown and is capable of detecting differential gloss images where the halftone structures of at least one of the color channels in an image exhibit at least some degree of anisotropy.

Figure 3:
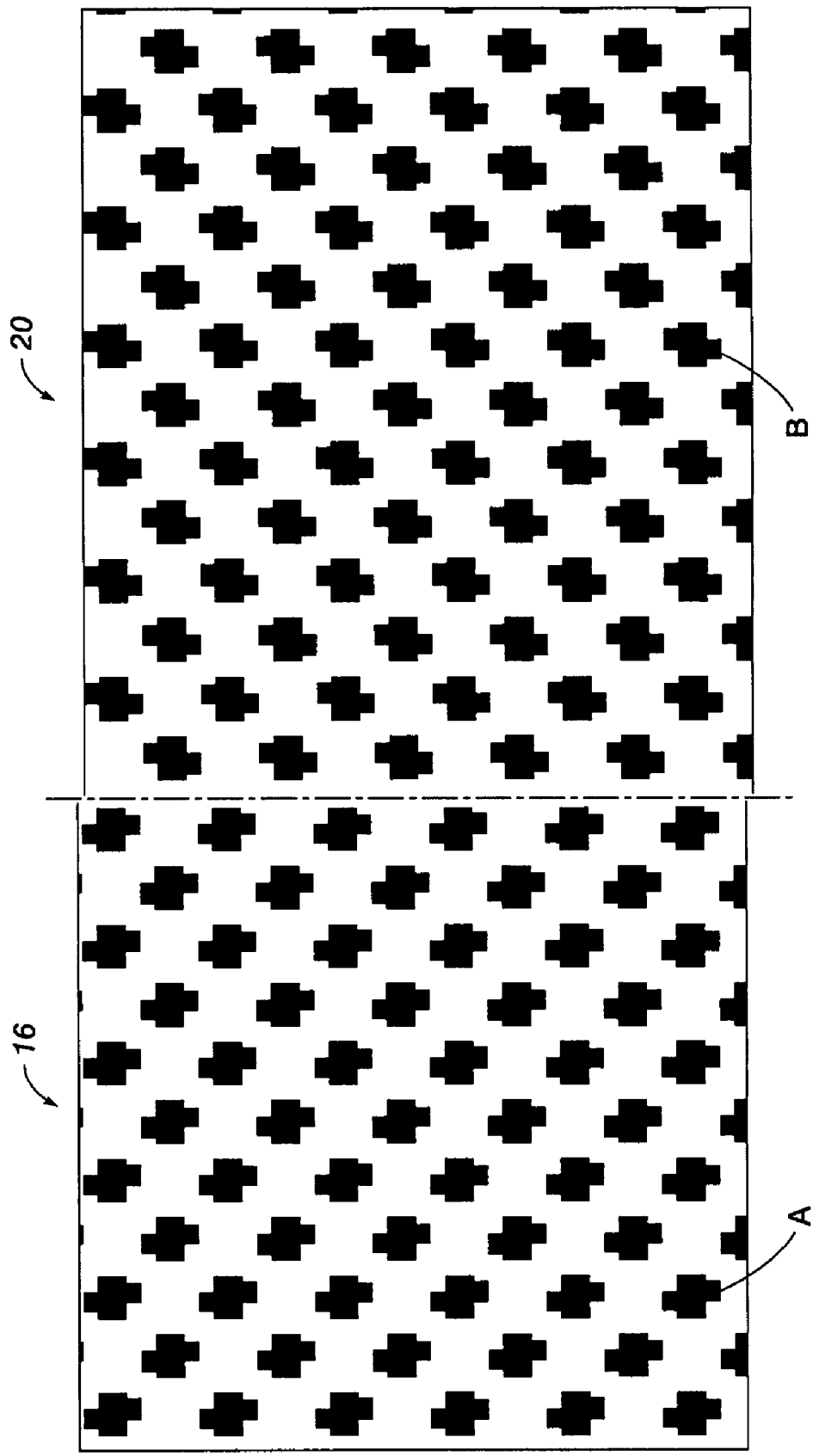
FIG. 3 illustrates regions of halftone structures generated with the screens of FIG. 1.

FIG. 2 depicts the creation of a Glossmark™ image 14 achievable using halftone screens as described above. A base (background) image 16 and a watermark image 18 are combined by screening the background image 16 with a first of the screens 10, 12 except for a region or regions 20 corresponding to the differential gloss pattern or "watermark," which is screened with a second of the halftone screens 10, 12. The resulting image 14 is a patchwork of the halftones created by the two screens. While the exemplary embodiment is described in terms of two halftone structures, it will be appreciated that more than two halftone structures may be employed in creation of the image. FIG. 3 illustrates a portion of an exemplary image 14, when printed, in which halftone structures of types A and B within first and second regions 20 and the remainder of 16, are shown magnified.

The watermark 20 may be utilized, for example, to provide security information for a ticket, coupon, or the like, to provide an indicia as to the source of the image, to provide personalized information in mass mailings, or to provide time varying information, such as a date on which the image is printed, and may include job processing/integrity numbers, bar-codes, company trademarks or logos, or the like.

As will be understood by those skilled in the art, the intended differential gloss image data may be flattened into simple zero and one pixel data representations. This pattern of zero and ones is then used to toggle a multiplexer to one halftone anisotropic structure orientation type or the other. A multiplexer therefore toggles between a type A screen and a type B screen, as dictated by the desired Glossmark™ data, to produce the composite result of raster input processed (RIP) image data as passed to a marking engine. In this way, a superimposition of a Glossmark pattern 20 is embedded into the primary image which can only be perceived as a gloss differential image.

The halftoned image data 14 thus formed may be stored as a digital image data file 22 to be rendered by the same or a different printer or device from the device creating the digital image file. For example, the image data file may be stored for later rendering on a printer which does not have software for creation of differential gloss images.

Figure 4:
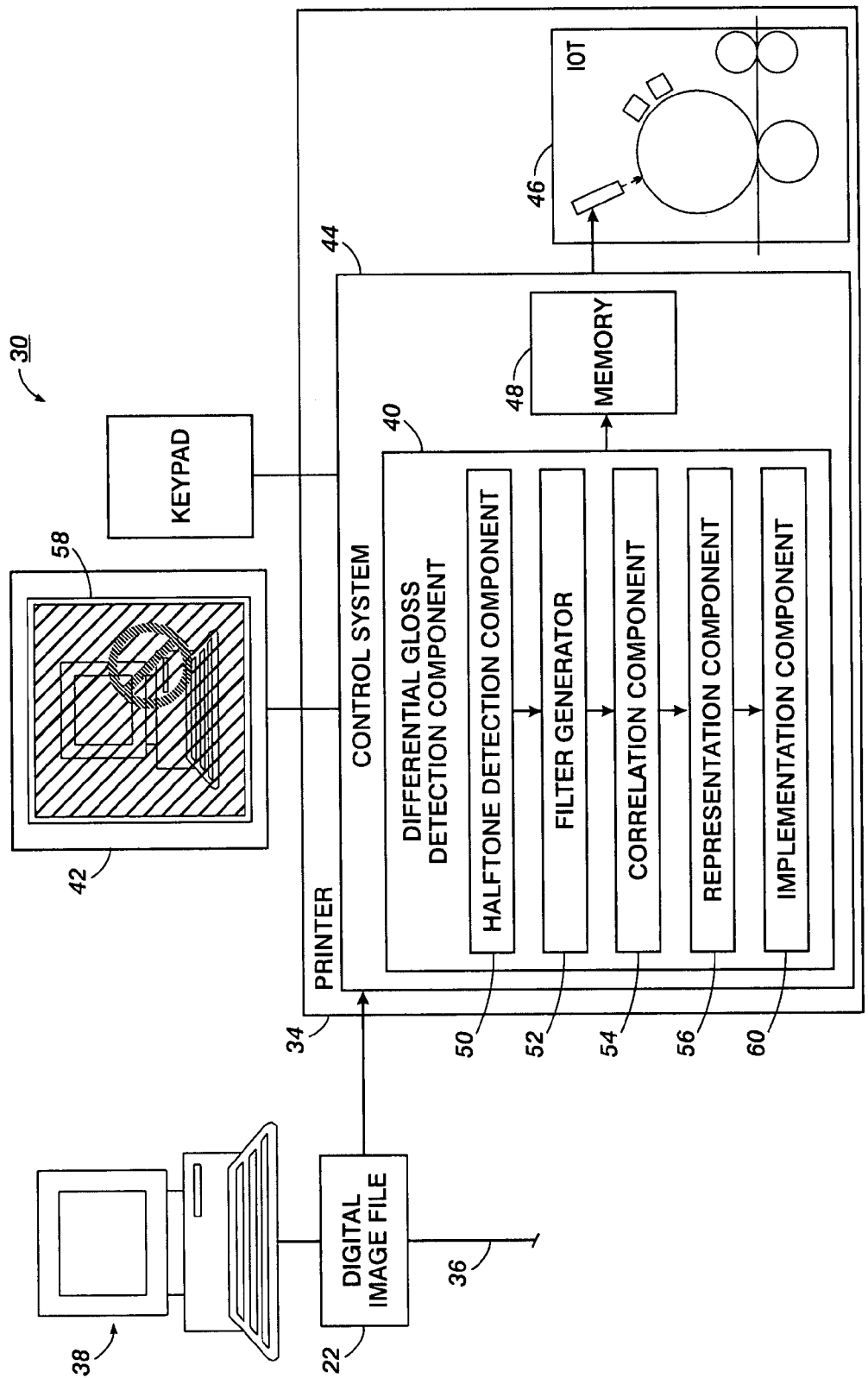
FIG. 4 is a functional block diagram of a system for detection of a region of differential gloss in a digital image.

With reference now to FIG. 4, an exemplary system 30 for detection of a differential gloss pattern in digital image data 14 of the type described above is shown. In the illustrated embodiment, the detection system 30 is embodied in a networked printer 34, although it is also contemplated that the system may be located elsewhere on a network 36 to which the printer 34 is connected, such as on a server, networked computer, or the like, or distributed throughout the network or otherwise accessible thereto.

The exemplary detection system 30 includes a processing component 40 and a display 42. The processing component 40 serves as a differential gloss detection component for detection of a differential gloss image, where present in an input file. The display 42 is in communication with the processing component 40 for displaying a representation of a detected differential gloss image. The differential gloss detection component 40 may be incorporated into a control system 44 for the printer 34 or as a plug-in software component. In general, the control system 44 receives incoming print jobs and converts them to a form in which they may be rendered by an associated marking engine 46.

The differential gloss detection component 40 executes instructions, which may be stored in associated memory 48, for performing the method outlined in FIG. 5, and described in further detail below. In particular, the differential gloss detection component 40 includes a halftone detection component 50 for identifying a periodicity in image data of an input image 14 which is indicative of a halftone image, a filter generator 52 which generates anisotropic filters matching the halftone structure of the input image, based on the output of the halftone detection component, and a correlation component 54 which identifies any regions of the image in which the halftone structures correlate more strongly with a first of the anisotropic filters than with a second of the anisotropic filters and may also identify any regions of the image which correlate more strongly with a second of the anisotropic filters than with a first of the anisotropic filters. The detection component 40 may further include a representation component 56 which generates a representation 58 of the image for display on the screen 42, based on the output of the correlation component. In the representation, regions of different halftone structure anisotropy are represented differently, in a manner which is visible on the screen 42. Alternatively or additionally, an implementation component 60 may implement a computer implemented step based on the output of the correlation component 54. The implementation component 60 may implement a first process for an input image where the correlation component output indicates that the image lacks a differential gloss pattern and may implement a second, different process for an input image where the correlation component output indicates that the image lacks a differential gloss pattern.

Figure 5:
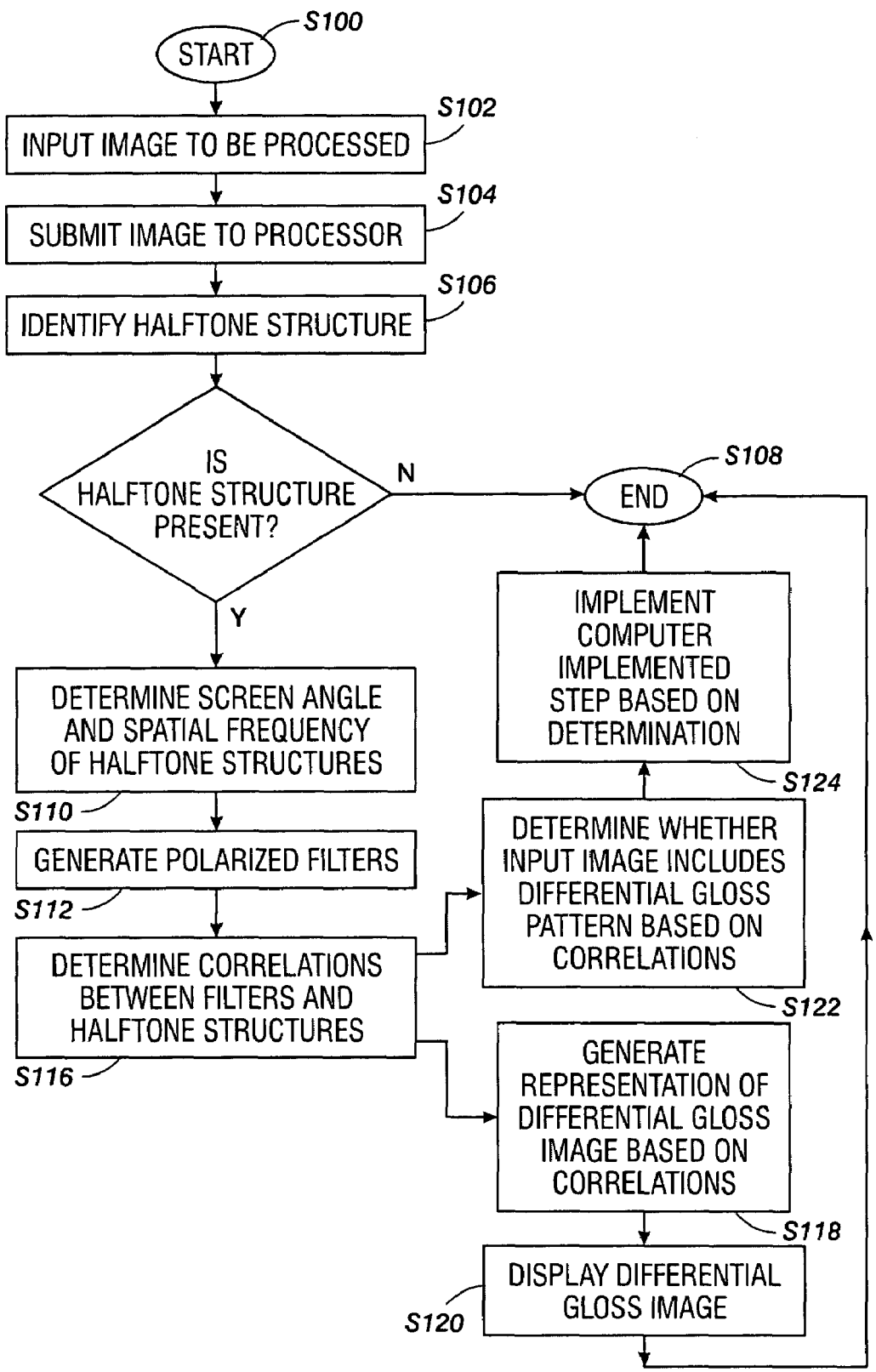
FIG. 5 is a flow diagram illustrating steps in an exemplary method for detection of a differential gloss image.

With reference now to FIG. 5, an exemplary method for detection of a differential gloss image in digital image data is shown. The method may be performed by the processing component 40 of FIG. 4. It is to be appreciated that the method may include fewer, more, or different steps from those illustrated and that the steps need not proceed in the order shown. The method begins at step S100.

At step S102, a digital image file 22 which includes one or more digital images, such as image 14, is received by the printer 34, e.g., in the form of a print job. The file 22 may be received via the network 36, e.g., from a networked computer 38 or input from an image data storage medium, such as a floppy disk, flexible disk, hard disk, magnetic tape, or any other magnetic storage medium, CD-ROM, DVD, or any other optical medium, a RAM, a PROM, an EPROM, a FLASH-EPROM, or other memory chip or cartridge.

Alternatively, the file 22 may be input to a computing device separate from the printer, on which the differential gloss detection component 40 is located, or retrieved from an image data storage device by that computing device.

At step S104, the digital image file is submitted to the differential gloss detection component 40. Particularly in the case of a printer, this step may proceed automatically for all incoming print jobs. Alternatively, the step may proceed at the request of user who is interested in knowing whether the file includes a differential gloss image. For example, the user may interact with the printer via a user interface, e.g., comprising display 42 and a user entry device 64, such as a keyboard, keypad, touch screen, or other user entry device. One such user interface is described in U.S. Pub. No. 20060127117, incorporated by reference.

At step S106, the digital image data for one or more images in the file 22 is evaluated to determine whether the submitted image (or images) is pre-halftoned by cluster screens. In particular, the image data is examined for periodicity in two orthogonal dimensions, for example, using Fourier transform analysis. In one embodiment, a Fast Fourier Transform (FFT) is applied to image data comprising at least a portion of the image. In one embodiment, a portion of the image less than the full image may be used, such as a region of about 512×512 pixels. The image data for a single channel may be examined for periodicity. Alternatively, image data for multiple channels may be examined for periodicity, for example, by taking the sum of the CMYK values of each pixel. Since the FFT output is in complex values, the modulus may be considered to identify whether the image is pre-halftoned. Other algorithms for spatial frequency analysis may be also used, such as Discrete Cosine Transforms (DCT).

FIG. 6 shows a representation of an exemplary plot of the FFT modulus showing the locations at which the modulus exceeds a threshold value. For a digital image (or selected region thereof which is specified by 512×512 pixels, its corresponding FFT output can be also specified by 512×512 pixels, representing the two spatial frequency components, fx and fy. The center, or the origin, of the FFT output represents the zero component, the dc term, with spatial frequencies fx=0 and fy=0. The minimal and the maximal spatial frequency values, $-\frac{1}{2}$ and $+\frac{1}{2}$ cpp (cycles per pixel), are represented by the pixel locations at −256 and +256 relative to the dc term of the FFT output.

In the case of an image which has been halftoned by a cluster screen, four strong peaks located symmetrically at ±θ degrees from the dc term indicate that the image has a two dimensional periodic structure, i.e., the image is pre-halftoned. In one embodiment, maximal peak values of the modulus, other than the dc term, can be identified and compared with threshold values. While the illustrated halftone screen peaks are angled at 45 degrees, the angles may be different for other orientations. However, the peaks are still symmetrically located.

If at step S106, four peaks above a predetermined threshold which are symmetrical with respect to at least one of the x and y axes cannot be identified, the differential gloss pattern detection component 40 identifies the image as not being pre-halftoned by a cluster halftone screen or screens and the method ends at step S108. If at step S106 four peaks, which have a modulus above a predetermined threshold, and which show symmetry with respect to at least one of the x and y axes have been identified, the input image is determined to be pre-halftoned by cluster halftone screen(s). The method then proceeds to step S110. As will be appreciated, the requirement for symmetry can accept some deviation from perfect symmetry while still being considered symmetrical. For example, if four peaks in the modulus are identified at ±θ from the dc term, where θ can vary by ±5 degrees, and the distance from the dc term can vary by ±5%, the input image may be determined to be halftoned.

At step S110, the periodicity and orientations of the halftone clusters are determined. For example, the screen angle may be determined from the orientation of the four peaks with respect to the dc term. For image data which has been pre-halftoned using a screen angle of ±45 degrees for example, the four strong peaks are located symmetrically at 45 and −45 degrees.

The spatial periodicity (tiling) of the halftone screens can be determined, based on the locations of the peaks. For example, in the illustrated embodiment, where the four peaks are located at exactly (±64, ±64), relative to the dc term, the FFT theory indicates that the input image has a periodic characteristic with spatial frequencies $\pm\frac{1}{8}$, $\pm\frac{1}{8}$ cpp as the tiling resulting from a cluster halftone screen. One possible screen configuration can be defined by two spatial vectors V1 (4, 4) and V2 (−4, 4), as illustrated schematically in FIG. 7. As will be appreciated, while FIG. 7 shows the clusters as circles, in the exemplary embodiment, the halftone clusters have anisotropy.

Figure 8:
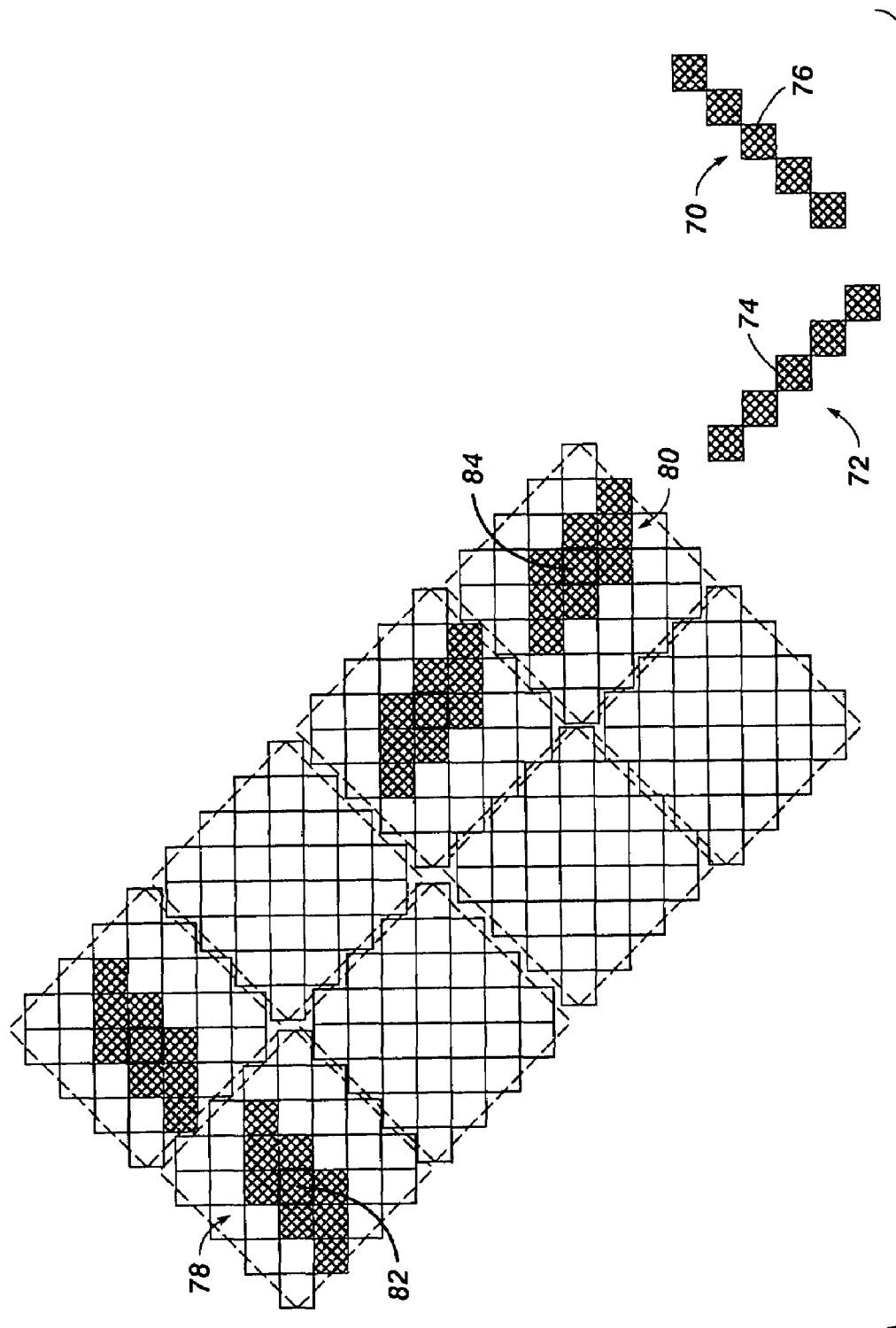
FIG. 8 illustrates exemplary anisotropic filters to be applied to the image data for identifying regions in which halftone structures correlate more strongly with one or other of the filters.

At step S114, two filters (masks) are designed. FIG. 8 illustrates exemplary filters 70, 72 to be applied to the image data. Each of the filters 70, 72 defines an anisotropic cluster of pixels which has about the size of the estimated halftone screen. As long as the cluster size is close to that of the halftone screen, the correlation peaks will be centered at the halftone cluster centers. If the filter cluster size is too large, the peaks are blurred, while too small of a filter cluster size will add more noise. In particular, each of the filters may comprise a plurality of contiguous pixels having centers 74, 76 with anisotropic structures. Each of the filters 70, 72 has a different general orientation (polarization). The orientation may be generally aligned with the screen angle in two orthogonal directions. For example, a first filter 70 is angled at +45 degrees to the slow scan direction and a second filter 72 is angled at −45degrees in the illustrated example. In one embodiment, the two filters 70, 72 are mirror images of each other. While in one embodiment, each filter 70, 72 comprises a group of contiguous pixels having a longest dimension generally aligned with the screen angle, e.g., corresponding to a line one pixel in thickness, other filters are contemplated, such as a filter which is more elliptical in shape. In general, the filters 70, 72 are selected such that a first of the filters 70 correlates more strongly, on average, with halftone structures 78 created by a first of the screens than with halftone structures 80 created by a second of the screens and a second of the filters 72 correlates more strongly, on average, with the halftone structures 80 created by the second of the screens than with the halftone structures 78 created by the first of the screens. For example, in the illustrated embodiment, where each filter comprises five pixels, if all five pixels of the image which are covered by the filter 70 or 72 are "on", the correlation is 100%. For fewer "on" pixels, the correlation may be lower, such as 0% or a value between 0% and 100%.

At step S116, correlations between the two polarization filters 70, 72 and groups of contiguous pixels in the halftone structures 78, 80 of the input image are calculated. This step may be performed over the entire input image, rather than just a portion, to identify regions of different polarization. In particular, the correlation reaches local peak values when the filters are at the positions where the centroids 74, 76 of the filters 70, 72 coincide with centers 82, 84 of the halftone clusters 78, 80. As will be appreciated, the correlation step may be analogous to translating the filter across the image, i.e., to move the filter stepwise by a fixed number of pixels in the fast scan and/or scan direction, determining the correlation, and repeating the process until the entire image has been analyzed.

The positions of the cluster centers 82, 84 may be determined from the FFT analysis performed at step S106. Since the results of the FFT analysis is in complex values, if a two dimensional halftone structure is detected, the phase values of the corresponding halftone frequencies provide the positions of the cluster centers. For example, if the phase of a frequency component is equal to zero, the centers of the clusters are at coordinate zero plus multiples of the length of the period. If the phase is equal to π, the centers of the clusters are at a half of the period plus multiples of the period.

Where the input image is a color image comprising multiple color channels, the correlation values of a plurality of the color channels may be combined to arrive at a correlation value which reflects the correlations of the plurality of color channels, e.g., by averaging the correlation values for all of the channels for the corresponding (e.g., overlapping) halftone structures.

The correlation values (or the average correlation values for multiple channels) can be thresholded to identify the locations of clusters in which at least a threshold correlation with a particular filter is found. Alternatively, for each cluster, the correlation values from the two filters may be compared and the filter with the highest correlation is considered to correlate with that particular cluster. Where both filters are equally correlated, both filters may be considered to correlate with the cluster.

As will be appreciated, if the shapes of the clusters are close to round, as are most halftone images, or are formed from halftone structures which all have the same orientation, the correlation results using the two filters will not show a statistically meaningful difference for two regions of the image. However, if a halftone image has differential gloss pattern embedded in it, significant differences in the correlations will be noted for a region or regions of the image corresponding to an embedded differential gloss image as compared with another region or regions, corresponding to the base image.

At step S118, a representation of the differential gloss image may be generated for display on the screen 42. In the representation, the watermark is made visible by using a method which renders the differently polarized regions differentiable on the screen. For example, regions of the image which correlate most strongly with the first filter are displayed in a first color and/or gray level while regions of the image which correlate more strongly with the second filter are displayed in a second color and/or gray level. For example, base regions may all be shown in magenta while watermark regions are all shown in yellow. Alternatively, the regions corresponding to the base image (i.e., the predominant polarization in the image) are shown in their normal colors while the differential gloss region is shown in a different color or gray level.

At step S120, the representational image 58 is displayed on the screen 42.

In one embodiment, the user may determine, based on the displayed image, whether the watermark is properly placed in the image. For example, if the watermark is located in a region of particularly high or particularly low gray level, it will not be readily seen. A user may therefore determine that the location of the watermark should be adjusted and may make appropriate adjustments to the watermark image.

In another embodiment, at step S122, the processor 40 automatically determines whether the image comprises a differential gloss image. For example, this step may include determining whether any of the regions determined to be of differential gloss is statistically significant in size to be likely to constitute an embedded differential gloss image. As will be appreciated, the area of a region of a differential gloss image generally has a minimum practical size for the differential gloss to be apparent to the viewer when embedded in a rendered image. Thus, regions of less than a predetermined size may be ignored as resulting from inaccuracies in the correlation method.

If at step S122, the processor 40 determines that the image comprises a differential gloss pattern (e.g., because a region of a minimum size correlates with a first of the filters 70 while an adjacent region 72 correlates with the second filter), at step S124, the processor may optionally perform a computer implemented step for the print job 22, based on the determination, such initiate an action which restricts printing. For example, the processor may initiate one or more of 1) warning a user of the printer 34 (e.g., via display 42) that the image 14 may not be printed without a password or other authorization, 2) refusing permission to print the image, 3) destroying the print job, or the like.

In one embodiment, the processor 40 may determine information from the shape and or orientation of the differential gloss image and perform a computer implemented step based on the information obtained. In one embodiment, the processor may perform OCR or other recognition techniques to obtain information from the differential gloss image and modify the computer implemented step based on the information conveyed. For example, the image may contain a variable Glossmark™, such as a date/time stamp™ which displays a date/time at which the digital image was created. If the date in the image, as recognized by the processor 40, is past an expiration date, the processor may prevent processing of the image.

The method illustrated in FIG. 5 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

As will be appreciated, all of the steps of the exemplary method may be performed without the need to print the image 14 on a physical substrate. This allows a differential gloss image to be detected based on the image data alone, without the need for human observation of the printed image or application of other techniques capable of detecting differences in gloss over a printed image.

Additionally, while the exemplary method is illustrated as being performed at the printer 34, it will be appreciated that steps of the method may be performed on a computing device which is remote from a printer.

The exemplary system and method enable a rapid screening of a large number of digital image files to be performed without the need for printing of the images.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for processing a digital image comprising:
   identifying a digital image which has a periodic characteristic that is indicative of a cluster-screen halftoned digital image; and
   determining, in an apparatus for processing images comprising a processor which executes instructions, a correlation between first and second filters and halftone structures of the identified digital image, the second filter having a different polarization from the first filter, the first and second filters being selected to enable a region of differential gloss in the identified digital image to be identified, based on the determined correlations.

2. The method of claim 1, further comprising:
generating a representation of the digital image which, when displayed, simulates at least one region of differential gloss, where present.

3. The method of claim 2, wherein the generation of the representation includes assigning a first color or gray level to a region of the digital image which correlates more strongly with the first filter than with the second filter and assigning a second color or gray level to a region of the image which correlates more strongly with the second filter than with the first filter.

4. The method of claim 1, wherein the identifying of the digital image which has a periodic characteristic which is indicative of a cluster-screen halftoned digital image comprises, for at least a portion of the image, performing spatial frequency analysis on the image data.

5. The method of claim 4, wherein the digital image is identified as a cluster-screen halftoned image where the modulus in the frequency domain of the analyzed image data exhibits peaks at four locations which are equally spaced from a central peak.

6. The method of claim 1, wherein the determination of the correlation includes generating first and second polarized filters with a size similar to a size of halftone structures in the image.

7. The method of claim 1, wherein the determining of the correlation includes determining correlation peaks above a threshold and identifying locations of correlation peaks in the digital image.

8. The method of claim 1, further comprising:
determining whether the digital image includes regions of differential gloss, based on the determined correlations.

9. The method of claim 1, further comprising:
for an image which is determined to include regions of differential gloss, implementing a computer implemented process.

10. The method of claim 9, wherein the computer implemented process includes restricting printing of the image.

11. The method of claim 1, wherein a first type of anisotropic halftone structures correlate more strongly with one of the first and second filters and wherein a second type of anisotropic halftone structures correlate more strongly with the other of the first and second filters.

12. The method of claim 1, wherein the region of differential gloss comprises a first type of anisotropic halftone structure and a second region of the image comprises a second type of anisotropic halftone structure.

13. The method of claim 1, wherein the region of differential gloss is one which, when printed on a substrate, has a different gloss characteristic from another region of the image.

14. An apparatus for processing images comprising a processor which executes instructions for performing the method of claim 1.

15. A tangible computer-readable medium on which instructions for performing a method for processing a digital image are recorded, the instructions comprising:

instructions for identifying a digital image which has a periodic characteristic that is indicative of a cluster-screen halftoned digital image; and instructions for determining a correlation between first and second filters and halftone structures of the identified digital image, the second filter having a different polarization from the first filter, the first and second filters being selected to enable a region of differential gloss in the identified digital image to be identified, based on the determined correlations.

16. A system for processing a digital image comprising:
a processing component which executes instructions stored in memory including;
a halftone detection component which identifies a digital image which has a periodic characteristic that is indicative of a cluster-screen halftoned digital image; and
a correlation component which determines a correlation between first and second filters and halftone structures of the identified digital image, the second filter having a different polarization from the first filter, the first and second filters being selected to enable a region of differential gloss in the identified digital image to be identified, based on the determined correlations.

17. The system of claim 16, further comprising:
a filter generator which generates the first and second filters based on a periodic characteristic identified by the detection component.

18. The system of claim 16, further comprising:
a representation component which generates a representation of the digital image which simulates differential gloss in the image.

19. The system of claim 18, further comprising:
a screen in communication with the representation component which displays the representation of the digital image.

20. The system of claim 16, further comprising:
an implementation component which implements a computer implemented process based on an output of the correlation component.

21. A method for processing a digital image comprising:
for a digital image which is determined to be cluster-screen halftoned;
generating in a control system of a printer a first polarized filter which correlates more strongly with halftone structures having a first anisotropic structure and a second polarized filter which correlates more strongly with halftone structures having a second anisotropic structure;
applying the first and second filters to the digital image such that a first region of halftone structures is distinguishable from a second region of halftone structures, where present, based on the correlations of the first and second polarized filters; and
generating a representation of the image whereby an identified first region is visually distinguishable from an identified second region.

22. The method of claim 21, wherein a first region of halftone structures is distinguished from a second region of halftone structures, where present, where the first region correlates more strongly with the first filter and the second region correlates more strongly with the second filter.

* * * * *